United States Patent Office 2,994,614
Patented Aug. 1, 1961

2,994,614
GOLD DECORATING COMPOSITIONS CONTAINING GOLD PRIMARY MERCAPTIDES
Howard M. Fitch, Millburn, N.J., assignor, by mesne assignments, to Engelhard Industries, Inc., Newark, N.J., a corporation of Delaware
No Drawing. Filed Nov. 19, 1958, Ser. No. 774,820
13 Claims. (Cl. 106—1)

This invention relates to new and improved gold decorating compositions.

Burnish gold decorating compositions are well known in the art and have been described, for example, by F. Chemnitius, J. Prakt. Chem. 117, 245 (1927), by K. H. Ballard in U.S. Patent No. 2,490,399 and by S. G. Chandra in British Patent No. 721,906. These compositions are also known as powder gold, paste gold, matte gold or polishing gold decorating compositions. The essential ingredient in the hitherto known burnish gold decorating compositions has been finely divided gold in the metallic state. Another ingredient is a gold flux such as the oxides and resinates of lead, boron, silicon, bismuth and silver. Another ingredient is an extender such as mercuric oxide, mercury resinate or sulfur. Still another ingredient in some compositions is an organic vehicle such as a mixture of essential oils and resins.

When applied to a refractory material such as glass, china and earthenware and fired by heating in a kiln, the burnish gold decorating compositions leave an adherent conductive gold film that is dull and matte in appearance. When burnished, the film takes on the soft golden luster characteristic of burnished gold. Although this effect is highly prized in the arts, the difficulty and expense of obtaining it with the previously known decorating compositions have severely limited the use of such compositions. The metallic gold powder should be very finely divided and uniform. This is difficult to achieve and requires expensive processing and very careful control. Moreover, even with a suitable gold powder, there is a tendency to agglomerate or metalize during the mixing and grinding operations needed to compound the burnish gold decorating composition. Furthermore, the metallic gold particles, being very heavy, tend to settle out of the composition, requiring frequent or constant agitation during application and causing non-uniformity in the applied film. A further disadvantage, particularly in applications on transparent or translucent objects such as glass, is poor covering power, requiring heavy application of gold in order to obtain an opaque film. Perhaps the greatest disadvantage of the known compositions, however, is the extensive burnishing required to bring the applied gold film to a suitable appearance. This is largely a hand operation and adds materially to the cost of the decoration.

In accordance with the present invention, it has been found that all or part of the metallic gold powder in burnish gold decorating compositions may be replaced by a gold primary mercaptide and that such replacement materially diminishes and in some cases eliminates the foregoing disadvantages of the hitherto known compositions. Best results are obtained when all of the gold powder is so replaced. Primary mercaptans are mercaptans in which at least two hydrogen atoms are attached to the carbon atom adjacent to the mercaptan sulfur atom. These mercaptans have the general formula $RCH_2SH$ in which R is hydrogen or an alkyl, aralkyl or aryl group. Generally speaking, the preferred mercaptans contain from one to about 20 carbon atoms in the molecule. Mercaptans containing from one to eight carbon atoms are particularly preferred due to the high gold content of the gold primary mercaptides obtained from them. Primary mercaptans react with gold salts to form aurous mercaptides of the formula $RCH_2SAu$ in which R is as given above. These aurous mercaptides will be referred to as gold primary mercaptides, since auric mercaptides are not known and the same aurous mercaptide is obtained from auric salts and from aurous salts.

The gold primary mercaptides may be prepared by known methods such as by admixing a primary mercaptan with a gold salt. A typical preparation is described in Example I. Suitable gold salts include auric bromide, auric iodide, potassium bromaurate and potassium iodoaurate. Auric chloride or potassium chloraurate are preferred, however, since they are stable and easy to prepare. Auric chloride is prepared by dissolving metallic gold in aqua regia and decomposing the nitric acid present by repeated evaporations with hydrochloric acid. Removal of the excess hydrochloric acid is not necessary, and the resulting solution of auric chloride in hydrochloric acid, known as gold liquor, is suitable for use in preparing gold primary alkyl mercaptides. The reaction mixture may be diluted with water or with solvents such as methanol or ethyl acetate. Preferably, from three to four moles of mercaptan to one mole of auric salt are used, and higher ratios may be employed, but without substantial advantage. The reaction temperature is not critical and may vary from 0° C. to about 100° C., so long as the boiling point of the mercaptan is not exceeded. When auric salts are used, the reaction product contains bis-primary disulfides, which may be removed by washing or leaching with a suitable solvent, such as methanol, ethyl acetate or acetone. The gold primary mercaptides may also be made from aurous salts, such as aurous cyanide, or from an aurous halide complex with a lower dialkyl sulfide as described in co-pending application S.N. 727,254. When an aurous salt or complex is used in the reaction a large excess of primary mercaptan is not needed and no disulfide is formed in the reaction. The gold primary mercaptides may be purified by crystallization from a suitable solvent, such as toluene, but such purification is not usually required.

Pure primary mercaptans are not essential to the practice of this invention, and commercial grades are suitable. Mixed primary mercaptans may also be employed to give mixtures of gold primary mercaptides.

The burnish gold decorating compositions of the invention are prepared by intimately mixing a gold primary mercaptide and a gold flux, with or without an organic vehicle. The mixing may be done by hand mulling or trituration or mechanically as in a ball mill. Preferably, however, the ingredients are mixed by milling in a steel roll mill of the type employed in the preparation of printing inks and pigments, using a minimum of organic vehicle to form a thick paste that is further diluted with an organic vehicle to give the consistency needed for the particular method of application in which the composition will be used. For application to surfaces that already contain a flux such as, for example, on porcelain enameled steel or aluminum or on glass or ceramic ware that has previously been decorated with fluxed enamel colors, the gold flux may be omitted from the gold decorating compositions, and a paste prepared from a primary gold mercaptide and an organic vehicle may be employed. Such compositions have limited utility and require very close control of the firing temperature, however, and it is preferable to include a gold flux in the composition, even for use on previously fluxed surfaces. Alternatively, an intimate mixture of a gold primary mercaptide and a gold flux may be prepared as a dust. This is applied on the ware to be decorated by dusting onto a film of an organic vehicle having the desired pattern and enough tack to retain the dust. The use of such dusting powders is laborious, however, and paste compositions containing an organic vehicle are preferred.

The choice of organic vehicle is dictated by the method by which the composition is to be applied. The vehicle will usually include mixtures of essential oils, terpenes, resins, and the like, carefully chosen to impart specific physical properties to the composition. These properties, such as oiliness, viscosity, evaporation rate, surface tension and tack, will vary for different methods of application, such as brushing, spraying, stippling, dipping, stamping, roller coating, printing, both direct and offset, hot or cold screen printing, stenciling, decalcomania, and the like. The requisite properties and the organic vehicles required to produce them are well known to those skilled in the art of making inks, paints and lacquers. Typical vehicles include mixtures of two or more of the following ingredients: methyl ethyl ketone, cyclohexanone, ethyl acetate, amyl acetate, Cellosolve, butanol, nitrobenzene, toluene, xylene, petroleum ether, chloroform, carbon tetrachloride, various terpenes, such as pinene, dipentene, dipentene oxide, and the like, essential oils, such as oils of lavender, rosemary, aniseed, sassafras, wintergreen, fennel and turpentine, Assyrian asphalt, various rosins and balsams, and synthetic resins. It is a distinct advantage of the compositions of the invention that they show relatively little tendency to settle or separate as compared to known compositions containing metallic gold powder. They require little or no stirring during application and may be applied as a smooth and uniform film.

The choice of ingredients for the gold flux determines the behavior of the gold film during and after firing, and is usually dictated by the composition of the article to be decorated and the use for which it is intended. The gold flux usually includes salts or resinates of bismuth, lead, boron or silicon or mixtures thereof. Salts or resinates of chromium, cadmium, tin, copper, cobalt, antimony or uranium may also be employed. The gold flux improves the adherence of the gold film and its resistance to abrasion and corrosive chemicals. The ingredients fuse to a low melting glass or glaze and are well understood by those skilled in the art of compounding glazes and porcelain enamels. Other ingredients may be added to alter the color of the gold film. Silver salts and resinates, for example, give a green gold, and palladium or platinum salts and resinates give a white gold. Extenders such as mercuric oxide, mercury resinate or sulfur may also be included, but are usually not needed in the compositions of the invention. Excellent covering power is obtained without the use of extenders. This is an advantage, since the extenders tend to give off toxic vapors when fired.

After application in a thin film by conventional techniques, the burnish gold decorating compositions are fired by heating in a kiln or oven, preferably in an oxidizing atmosphere, at least during the early stages of the firing cycle. It will usually be desirable to heat to the point of incipient softening of the material on which the film has been applied, which may vary from about 500° C. for a soft glass to about 800° C. for a porcelain, and even higher for very refractory materials such as Pyroceram or quartz to improve the adherence of the gold film. Although burnish gold decorating compositions are principally used on glass, including soda lime and borosilicate glasses which may be clear, opal or colored, and ceramics, such as earthenware and porcelain, they may also be applied to other refractory material including metals, such as stainless steel and aluminum, carbon, mica, porcelain enameled steel or aluminum and the like.

While the decorative effect is an outstanding property of the film of metallic gold produced from gold compositions, these films inherently possess other useful properties, such as reflectivity to light and particularly to infrared radiation, making them useful on reflectors for lamps, ovens and the like; electrical conductivity, making them useful in forming printed circuits and resistors and as bases for electroplating and for plating by dipping in molten metals and alloys; and chemical inertness, making them useful for protecting the underlying surface from corrosion, oxidation and the like. In speaking of decoration and decorating decompositions, it is intended to include the other useful properties inherent in the gold films produced.

In many instances, it is desirable to include a liquid bright gold in burnish gold decorating compositions, and the compositions of the invention include compositions containing a liquid bright gold in addition to the gold primary mercaptide. Liquid bright golds have been described by Chemnitius and by others. They contain a gold resinate prepared by reacting a gold salt with a sulfurized terpene, such as sulfurized Venetian turpentine. The gold resinate is dissolved in solvents such as essential oils, terpenes, nitrobenzene, amyl acetate and the like, and the composition contains gold fluxes, such as salts and resinates of chromium, bismuth, lead, cadmium, tin, copper, cobalt, antimony and uranium, Assyrian asphalt and various rosins. Salts and resinates of rhodium or iridium are usually included to improve the continunity and brilliance of the gold film, and salts and resinates of silver, palladium or platinum may be included to modify the color of the gold film. The use of a gold cyclic terpene mercaptide in place of the gold resinate has been described in U.S. Patent No. 2,490,399, and the use of a gold tertiary mercaptide in place of the gold resinate has been described in co-pending application S.N. 727,254. When applied in a thin film on smooth refractory materials and fired, the liquid bright golds give a brilliant specular film of metallic gold.

The inclusion of a liquid bright gold in the burnish gold decorating compositions of the invention gives a fired film before burnishing that is brighter and less matte than the films obtained from compositions containing no liquid bright gold. Thus, by increasing the proportion of liquid bright gold, the appearance of the unburnished fired film can be varied from completely matte to only very slightly matte. Films that are only moderately matte require less burnishing than do films that are heavily matte and are particularly desirable on transparent materials, such as glass, since they present a better appearance on the unburnished under surface of the film. Moreover, by adjusting the proportion of liquid bright gold, unburnished films may be obtained that closely simulate the appearance of a burnished gold film. This is highly advantageous in eliminating the cost of burnishing and thus materially decreasing the cost of applying the gold decoration. While the best proportions will depend upon the exact effect desired and upon the nature of the gold primary mercaptide and liquid bright gold used, the closest simulation of burnished gold will usually be obtained in compositions in which from about 20 to about 60 percent of the gold is in the form of a gold primary mercaptide and the remainder is in the form of a liquid bright gold. In speaking of gold decorating compositions, it is meant to include compositions that give a film simulating burnished gold even though not burnished. When relatively high proportions of liquid bright gold are used, additional fluxes or vehicles may not be needed. When relatively low proportions of liquid bright gold are used, additional fluxes and vehicles as previously described should be included in the composition.

The gold content of the burnish gold decorating compositions of the invention varies with the intended use and the effect desired. Generally speaking, powders or concentrated pastes that are to be further diluted before use will contain from about 40 to about 70 percent or more of gold. Compositions that are to be applied by brushing, printing, stamping and the like will contain from about 10 to about 40 percent gold. Compositions that are to be sprayed will contain even less gold, and it should be recognized that the same quantity of gold per unit area of surface can be obtained by a heavy application of a composition of relatively low gold content or by a light application of a composition of relatively high gold content.

EXAMPLE I

*Gold ethyl mercaptide*

A five-liter round-bottom flask fitted with sealed stirrer, thermometer, addition funnel and reflux condenser was charged with a solution of 500 g. commercial grade ethyl mercaptan dissolved in 2 liters of methanol. The flask was cooled in an ice bath, and a mixture of 1132.2 g. 34.48% gold liquor (a solution of chlorauric acid in hydrochloric acid containing 34.48% gold) and 750 cc. ethyl acetate was added with stirring at 8 to 10° C. during 2 hours. A voluminous light tan precipitate formed. After standing in the ice bath for 2 hours longer, the reflux condenser was replaced with a still head and condenser arranged for distillation, and the flask was slowly heated with stirring to remove excess mercaptan. Methanol was added as needed to maintain the volume approximately constant. After about 2⅔ hours a liter of distillate had been obtained and the temperature of the still head was 64° C. The mixture was cooled and filtered on a Buchner funnel. The precipitate, washed on the filter with 1 liter of methanol and with 2 liters of acetone and air-dried, was 517.0 g. of gold ethyl mercaptide as a pale yellow solid containing 76.21% gold.

EXAMPLE II

*Decorating compositions containing gold ethyl mercaptide*

(A) The following ingredients were milled in a roll mill to give a smooth paste containing 36.3% gold.

| Ingredient: | Parts by weight |
| --- | --- |
| Gold ethyl mercaptide (76.2% Au) | 10 |
| Bismuth resinate dissolved in a mixture of essential oils (4.5% Bi) | 5 |
| Fat oil (oxidized turpentine) | 5 |
| Rectified turpentine | 1 |
| Total | 21 |

This paste was thinned with rectified turpentine to brushing consistency and applied to an earthenware dish. When fired to 740° C. an adherent matte film was obtained that burnished well.

(B) A liquid bright gold decorating composition containing 20% gold, 0.37% bismuth and 0.05% rhodium was prepared by mixing the following ingredients:

| Ingredient: | Parts by weight |
| --- | --- |
| Gold resinate dissolved in a mixture of essential oils and hydrocarbons (24% Au) | 100 |
| Rhodium resinate dissolved in a mixture of essential oils and hydrocarbons (1% Rh) | 6 |
| Bismuth resinate dissolved in a mixture of essential oils (4.5% Bi) | 10 |
| Rectified turpentine | 4 |
| Total | 120 |

A mixture of 9 parts by weight of this liquid bright gold and 1 part by weight of gold ethyl mercaptide was ground to a smooth paste by hand mulling to give a composition containing 25.6% gold. This paste was thinned to brushing consistency with Canada balsam and applied to an earthenware dish. When fired to 740° C. an adherent, very slightly matte film was obtained that simulated the appearance of burnished gold. The appearance was a little brighter after burnishing.

(C) A mixture of 8 parts by weight of the liquid bright gold described in (B) above and 2 parts by weight of gold ethyl mercaptide was ground to a smooth paste by hand mulling to give a composition containing 31.2% gold. This paste was thinned to brushing consistency with rectified turpentine and applied to an earthenware dish. When fired to 740° C. an adherent slightly matte film was obtained that closely simulated the appearance of burnished gold. Similar results were obtained with a similar composition prepared from a commercially available liquid bright gold. A somewhat better appearance was obtained when the mixing was done on a roll mill and the application was made mechanically, as by machine banding.

(D) A mixture of 6 parts by weight of the liquid bright gold described in (B) above, 4 parts by weight of gold ethyl mercaptide and 2 parts by weight of Canada balsam was ground to a smooth paste by hand mulling to give a composition containing 35.4% gold. This paste was thinned to brushing consistency and applied to an earthenware dish. When fired to 740° C. an adherent moderately matte film was obtained that had a pleasing appearance before burnishing and burnished very easily. A similar result was obtained when the composition was applied to a soda lime clear glass tumbler, fired to 600° C., and to a china dish, fired to 740° C. Similar results were also obtained when the gold resinate in the liquid bright gold was replaced by gold pinene mercaptide, prepared as described in Example I of U.S. Patent No. 2,490,399, and by gold tert. dodecyl mercaptide, prepared as described in Example VII-e of U.S. patent application S.N. 727,254.

(E) A dusting powder containing 72.4% gold was prepared by mixing 76 parts by weight of gold ethyl mercaptide, 3 parts by weight of lead borate and 1 part by weight bismuth subnitrate and brushing the mixture through a 300 mesh screen. A design of thin pine tar was applied to an earthenware dish and to a soda lime clear glass tumbler by stamping with a rubber stamp. The design was dusted well with the dusting powder, and excess dust was wiped off. When the ware was fired to a maximum of about 620° C. in a continuous lehr with a firing cycle of one and one-fourth hours, a matte gold design was obtained that burnished easily.

EXAMPLE III

*Decorating composition containing gold n-octyl mercaptide*

A mixture of 6 parts by weight of the liquid bright gold described in Example II-B, 4 parts by weight of gold n-octyl mercaptide (containing 57.6% Au) and 2 parts by weight of Canada balsam was ground to a smooth paste by hand mulling to give a composition containing 29.2% gold. This paste was thinned to brushing consistency and applied to an earthenware dish. When fired to 740° C. an adherent matte film was obtained that burnished easily.

EXAMPLE IV

*Decorating composition containing gold n-dodecyl mercaptide*

A mixture of 6 parts by weight of the liquid bright gold described in Example II-B, 4 parts by weight of crude gold n-dodecyl mercaptide (prepared from a commercial grade of mercaptan that is principally about 7 parts n-dodecyl mercaptan and 3 parts n-tetradecyl mercaptan) containing 48.4% gold and 2 parts by weight of Canada balsam was ground to a smooth paste by hand mulling to give a composition containing 26.1% gold. This paste was thinned to brushing consistency and applied to an earthenware dish. When fired to 740° C. an adherent matte film was obtained that burnished easily.

EXAMPLE V

*Decorating composition containing gold benzyl mercaptide*

A mixture of 6 parts by weight of the liquid bright gold described in Example II-B, 4 parts by weight of gold benzyl mercaptide (containing 60.3% gold) and 2 parts by weight of Canada balsam was ground to a smooth paste by hand mulling to give a composition containing 30.1% gold. This paste was thinned to brushing consistency and applied to an earthenware dish. When fired to 740° C. an adherent matte film was obtained that burnished well.

It will be obvious to those skilled in the art that many modifications may be made within the scope of the present invention without departing from the spirit thereof, and the invention includes all such modifications.

What is claimed is:

1. A gold decorating composition which comprises a gold primary mercaptide and a gold flux.
2. A composition according to claim 1 in which the mercaptide is gold ethyl mercaptide.
3. A composition according to claim 1 in which the mercaptide is gold n-octyl mercaptide.
4. A composition according to claim 1 in which the mercaptide is gold n-dodecyl mercaptide.
5. A composition according to claim 1 in which the mercaptide is gold benzyl mercaptide.
6. A composition according to claim 1 including an organic vehicle.
7. A gold decorating composition which comprises a gold primary mercaptide and a liquid bright gold.
8. A composition according to claim 7 in which the mercaptide is gold ethyl mercaptide.
9. A composition according to claim 7 in which the mercaptide is gold n-octyl mercaptide.
10. A composition according to claim 7 in which the mercaptide is gold n-dodecyl mercaptide.
11. A composition according to claim 7 in which the mercaptide is gold benzyl mercaptide.
12. A composition according to claim 1 in which the gold primary mercaptide has the general formula $$RCH_2SAu$$

wherein R is selected from the group consisting of hydrogen, aralkyl, alkyl and aryl.

13. A composition according to claim 7 in which the gold primary mercaptide has the general formula $$RCH_2SAu$$

wherein R is selected from the group consisting of hydrogen, aralkyl, alkyl and aryl.

References Cited in the file of this patent

UNITED STATES PATENTS

| | | |
|---|---|---|
| 2,370,593 | Trenner et al. | Feb. 27, 1945 |
| 2,490,399 | Ballard | Dec. 6, 1949 |
| 2,842,457 | Morgan et al. | July 8, 1958 |

FOREIGN PATENTS

| | | |
|---|---|---|
| 560,094 | Great Britain | Mar. 20, 1944 |